E. R. Whitney,
Hay Cap.

No. 84,453.      Patented Nov. 24, 1868.

Witnesses
Leopold Obert
R. M. Eastman

Inventor
E. R. Whitney
per Alexander & Mason
Attys

E. R. WHITNEY, OF PLATTSBURG, NEW YORK.

*Letters Patent No. 84,453, dated November 24, 1868.*

IMPROVEMENT IN COVER FOR HAY AND GRAIN-COCKS.

The Schedule referred to in these Letters Patent and making part of the same.

*To all whom it may concern:*

Be it known that I, E. R. WHITNEY, of Plattsburg, in the county of Clinton, and in the State of New York, have invented certain new and useful Improvements in Device for Protecting Hay and Grain in the Cock and Stack; and do hereby declare that the following is a full, clear, and exact description thereof, reference being had to the accompanying drawings, and to the letters of reference marked thereon.

The nature of my invention consists in the manufacture, from water-proof paper, of a suitable cap or protection for hay and grain in the stack or cock, which is cheap, and, at the same time, durable.

In order to enable others skilled in the art to which my invention appertains, to make and use the same, I will now proceed to describe its construction and operation, referring to the annexed drawings, which form a part of this specification, and in which—

Figure 3:
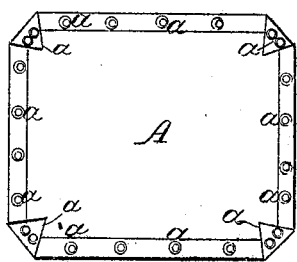

Figure 3, a bottom view of the same.

A represents a sheet of water-proof paper, of suitble size to cover the top of the stack. This paper is generally made water-proof by passing through a solution of acid, but may be made in any of the known and usual ways.

The edges of the sides and corners of the sheet A are turned over on the under side, as shown in fig. 3, and a number of eyelets, *a a*, are placed all around the same.

Figure 1:
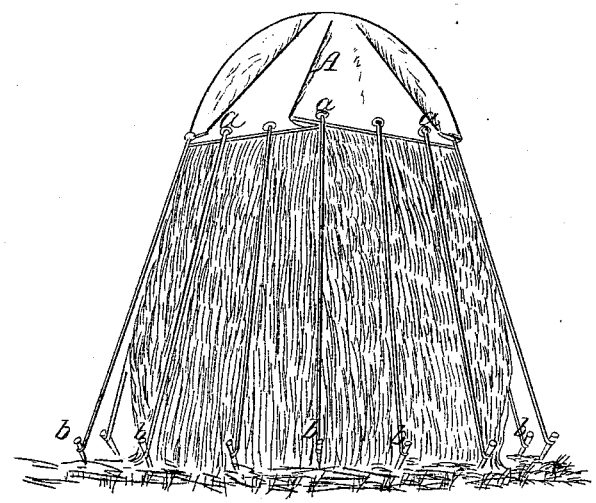
Figure 1 shows a stack of hay covered with my device.
Figure 2:
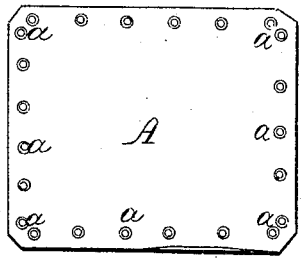
Figure 2 is a plan view of the cap.

When this cap is to be used, it is placed over the stack or cock, as shown in fig. 1, ropes passed through the eyelets *a a*, and fastened in the ground by pins *b b*.

The size of the sheet A, I intend to be generally about one yard square, but it may be made any size desired.

By turning down the edges, as above mentioned, the danger of tearing or otherwise injuring the same is greatly lessened.

I am aware that water-proof paper has long been known and used for various purposes.

Having thus fully described my invention,

What I claim as new, and desire to secure by Letters Patent, is—

As a new article of manufacture, the herein-described cover for grain and hay-stacks and cocks, when the same is constructed of water-proof paper, and provided with holes for the guys, substantially as and for the purposes herein set forth.

In testimony that I claim the foregoing, I have hereunto set my hand, this 11th day of November, 1868.

E. R. WHITNEY.

Witnesses:
A. N. MARR,
J. M. MASON.